(12) United States Patent
Chang et al.

(10) Patent No.: US 12,510,769 B2
(45) Date of Patent: Dec. 30, 2025

(54) CONTACT LENS AND MANUFACTURING METHOD THEREOF

(71) Applicant: PEGAVISION CORPORATION, Taoyuan (TW)

(72) Inventors: Han-Yi Chang, Taoyuan (TW); Li-Tan Chang, Taoyuan (TW); Wan-Rong Tang, Taoyuan (TW); Yi-Chiou Chang, Taoyuan (TW); Yu-Cheng Hu, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 801 days.

(21) Appl. No.: 17/654,235

(22) Filed: Mar. 9, 2022

(65) Prior Publication Data

US 2023/0088024 A1 Mar. 23, 2023

(30) Foreign Application Priority Data

Sep. 17, 2021 (WO) ................ PCT/CN2021/118935

(51) Int. Cl.
*G02C 7/04* (2006.01)
*B29D 11/00* (2006.01)

(52) U.S. Cl.
CPC .......... *G02C 7/04* (2013.01); *B29D 11/00038* (2013.01); *B29D 11/00894* (2013.01); *G02C 7/046* (2013.01)

(58) Field of Classification Search
CPC .... G02C 7/04; G02C 7/046; B29D 11/00894; B29D 11/00038; B29D 11/00317
See application file for complete search history.

(56) References Cited

U.S. PATENT DOCUMENTS

| | | | | |
|---|---|---|---|---|
| 8,870,371 | B2* | 10/2014 | Ando | B41M 5/0047 |
| | | | | 351/159.31 |
| 9,798,162 | B2* | 10/2017 | Duis | G02C 7/046 |
| 2004/0119939 | A1 | 6/2004 | Clark et al. | |
| 2011/0069276 | A1* | 3/2011 | Tucker | B29D 11/00961 |
| | | | | 351/159.24 |

(Continued)

FOREIGN PATENT DOCUMENTS

| | | |
|---|---|---|
| CN | 1046612 A | 10/1990 |
| CN | 111077680 A | 4/2020 |

(Continued)

*Primary Examiner* — Balram T Parbadia
*Assistant Examiner* — Alex Park Rickel
(74) *Attorney, Agent, or Firm* — CKC & Partners Co., LLC

(57) ABSTRACT

A contact lens includes a lens body and a color ink layer. The color ink layer is embedded in the lens body and includes a plurality of color ink membrane thicknesses. The color ink membrane thicknesses are different from each other. The color ink layer includes a plurality of color ink elements, and the color ink elements include M types of areas, in which M is a natural number greater than one. The color ink layer further includes color ink membrane thicknesses from a first color ink membrane thickness to a (1+n)-th color ink membrane thickness, in which n is a natural number greater than zero. These color ink membrane thicknesses and the M types of areas form M*(1+n) units of color ink concentration, and the M*(1+n) units of color ink concentration forms a multicolor pattern in the lens body.

5 Claims, 12 Drawing Sheets

(56) References Cited

U.S. PATENT DOCUMENTS

2015/0035881 A1\* 2/2015 Chou .............. B29D 11/00038
　　　　　　　　　　　　　　　　　　　347/2

FOREIGN PATENT DOCUMENTS

| CN | 111741847 A | 10/2020 | | |
|---|---|---|---|---|
| JP | 2013506159 A | 2/2013 | | |
| JP | 2016170414 A | 9/2016 | | |
| KR | 20110106102 A | 9/2011 | | |
| WO | 2011/161920 A1 | 12/2011 | | |
| WO | WO-2018189572 A1 \* | 10/2018 | ....... | B29D 11/00125 |

\* cited by examiner

CONTACT LENS AND MANUFACTURING METHOD THEREOF

CROSS-REFERENCE TO RELATED APPLICATION

This application claims priority to International application No. PCT/CN2021/118935, filed Sep. 17, 2021, which is herein incorporated by reference in its entirety.

BACKGROUND

Field of Invention

The present disclosure relates to a contact lens and a manufacturing method thereof.

Description of Related Art

In order to meet the needs of the users who do not like to wear traditional glasses with frames, contact lenses have become a widely circulated product on the market. In recent years, due to the strong demand for cosmetics, contact lenses printed with different colors and patterns have also appeared one after another. In the contact lens manufacturing method known in the industry, the operator who performs pattern pad printing uses a template to press against the transparent plastic material (for example, forming the transparent dry lens of the lens part of the contact lens) to allow the color ink on the template to be transferred to the transparent plastic material, so that the contact lens has a pattern.

However, the patterns of conventional contact lenses can only show contrast or gradation through the difference in size and color between several color ink elements. In addition, the prior art related to contact lens pattern printing also has its limitations. The above limitations lead to patterns that can show pattern contrast through the difference in the diameter and color of the color ink elements, but other methods cannot be used to break through the visual contrast, level, and three-dimensional effect of the patterns.

Therefore, how to provide a contact lens and a method of manufacturing thereof that can solve the aforementioned problems is one of the problems that the industry urgently wants to invest in research and development resources to solve.

SUMMARY

In view of this, one purpose of present disclosure is to provide a contact lens and a manufacturing method thereof that can solve the aforementioned problems.

In order to achieve the above objective, according to one embodiment of the present disclosure, a contact lens includes a lens body and a color ink layer. The color ink layer is embedded in the lens body and includes a plurality of color ink membrane thicknesses. The color ink membrane thicknesses are different from each other. The color ink layer includes a plurality of color ink elements, and the color ink elements include M types of areas, in which M is a natural number greater than one. The color ink layer further includes color ink membrane thicknesses from a first color ink membrane thickness to a $(1+n)$-th color ink membrane thickness, in which n is a natural number greater than zero. These color ink membrane thicknesses and the M types of areas form $M*(1+n)$ units of color ink concentration, and the $M*(1+n)$ units of color ink concentration forms a multicolor pattern in the lens body.

In one or more embodiments of the present disclosure, the color ink membrane thicknesses are in the range from 4 μm to 316 μm.

In one or more embodiments of the present disclosure, the color ink elements comprise at least one first color ink element and at least one second color ink element, the at least one first color ink element has a first diameter, and, the at least one second color ink element has a second diameter.

In one or more embodiments of the present disclosure, the first diameter and the second diameter are in the range from 0.03 mm to 14 mm.

In one or more embodiments of the present disclosure, the color ink layer comprises a first sublayer and a second sublayer, the first sublayer has a first color, and the second sublayer has a second color.

In one or more embodiments of the present disclosure, the first sublayer has a plurality of first color ink membrane thicknesses, the second sublayer at least has a second color ink membrane thickness, and the color ink layer at least has a third color ink membrane thickness where the first sublayer and the second sublayer overlap.

In one or more embodiments of the present disclosure, the $M*(1+n)$ unit color ink concentrations comprise at least one color ink pigment.

In order to achieve the above objective, according to one embodiment of the present disclosure, a method of manufacturing a contact lens includes: forming a color ink layer in a lower mold, wherein the color ink layer has a plurality of color ink membrane thicknesses, and the color ink membrane thicknesses are different from each other; assembling an upper mold with the lower mold; filling a transparent plastic material between the upper mold and the lower mold to cover the color ink layer; and solidifying the transparent plastic material into a lens body, so that the color ink layer is embedded in the lens body.

In one or more embodiments of the present disclosure, the method of manufacturing the contact lens further includes filling a transparent protection layer into the lower mold.

In one or more embodiments of the present disclosure, filling the transparent protection layer into the lower mold is performed before forming the color ink layer in the lower mold, so that the color ink layer is formed in the transparent protection layer.

In one or more embodiments of the present disclosure, forming the color ink layer in the lower mold includes: filling a color ink into a plurality of recesses on a template, in which the recesses have different depths; and pad printing the filled color ink into the lower mold, in which the color ink forms the color ink layer in the lower mold.

In one or more embodiments of the present disclosure, forming the color ink layer in the lower mold includes: filling a first color ink into a plurality of first recesses on a first template, in which the first recesses have different depths; pad printing the filled first color ink into the lower mold; filling a second color ink into a plurality of second recesses on a second template, in which the second recesses have different depths; and pad printing the filled second color ink into the lower mold, in which the first color ink and the second color ink form the color ink layer in the lower mold.

In one or more embodiments of the present disclosure, the first color ink and the second color ink have different colors.

In one or more embodiments of the present disclosure, the first color ink and the second color ink respectively constitute a first sublayer and a second sublayer of the color ink layer, the first sublayer has a plurality of first color ink membrane thicknesses, the second sublayer at least has a second color ink membrane thickness, and the color ink layer at least has a third color ink membrane thickness where the first sublayer and the second sublayer overlap.

In summary, in the contact lens and the manufacturing method thereof of the present disclosure, by engraving a number of recesses of different depths on the template, the effect of printing color inks of different thicknesses onto the lens body in one step is achieved. In addition, in the contact lens and the manufacturing method thereof of the present disclosure, because the thicknesses of several color inks and the area of the color ink elements in the contact lens are different from each other, the pattern presented has stronger contrast, gradation, and three-dimensional effect than the pattern of the contact lenses in the market.

The above-mentioned description is only used to explain the problem to be solved by the present disclosure, the technical means to solve the problem, and the effects produced, etc. The specific details of the present disclosure will be well discussed in the following embodiments and related drawings.

BRIEF DESCRIPTION OF THE DRAWINGS

In order to make the above and other objectives, features, advantages and examples of the present disclosure more obvious, the description of the accompanying drawings is as follows.

DETAILED DESCRIPTION

Figure 1:
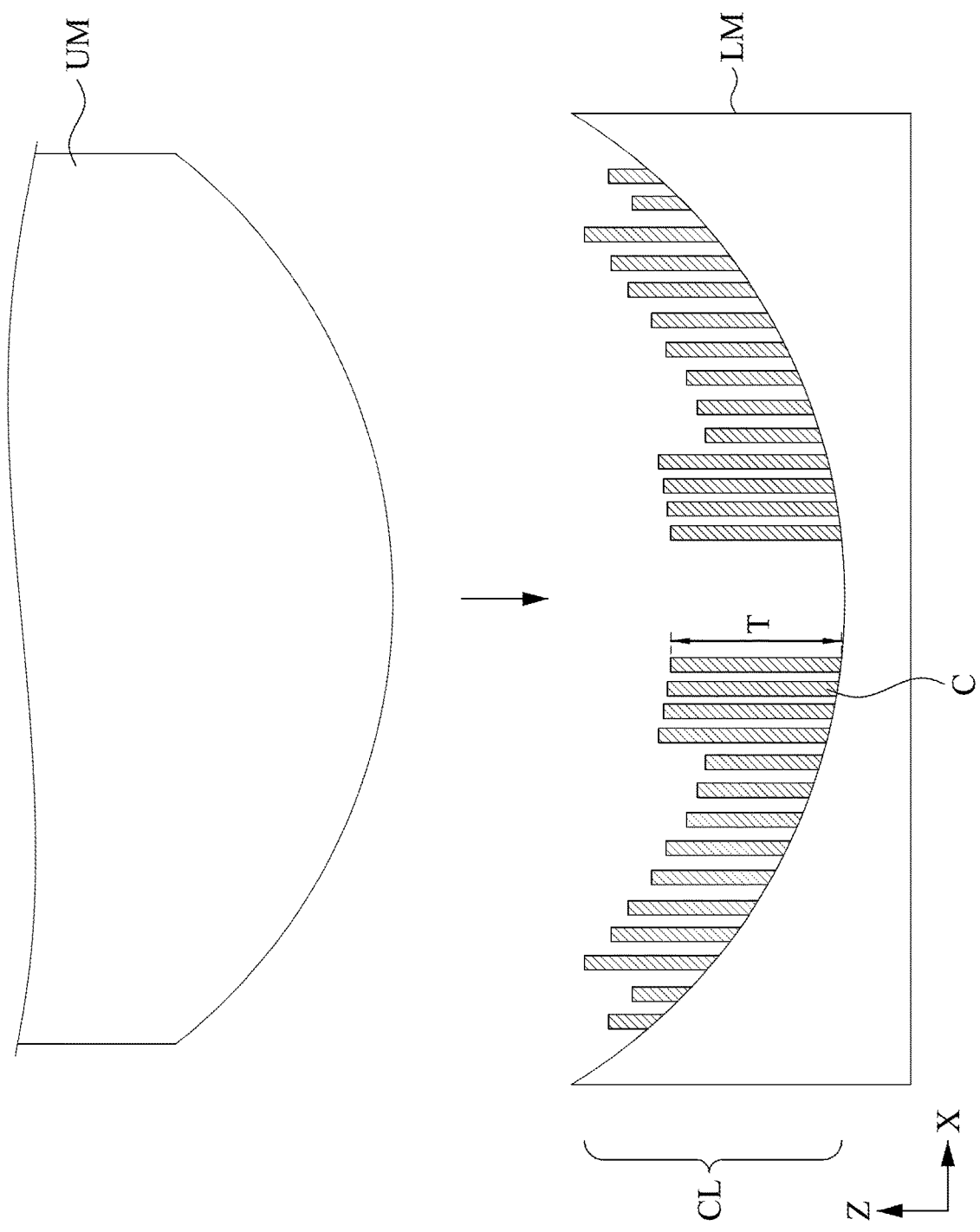
FIG. 1 shows a schematic view of manufacturing a contact lens using a upper mold and a lower mold in accordance with an embodiment of present disclosure.

Hereinafter, a plurality of embodiments of the present disclosure will be disclosed in diagrams. For clarity of discussion, many details in practice will be described in the following description. However, it should be understood that these details in practice should not limit present disclosure. In other words, in some embodiments of present disclosure, these details in practice are unnecessary. In addition, for simplicity of the drawings, some conventionally used structures and elements will be shown in a simple schematic manner in the drawings. The same reference numbers are used in the drawings and the description to refer to the same or like parts.

Hereinafter, the detailed steps of a method 600 of manufacturing a contact lens of this embodiment will be described in detail. Please also refer to FIG. 1, FIG. 2, FIG. 3, FIG. 4, FIG. 5, FIG. 6, FIG. 7, and FIG. 8.

Figure 6:
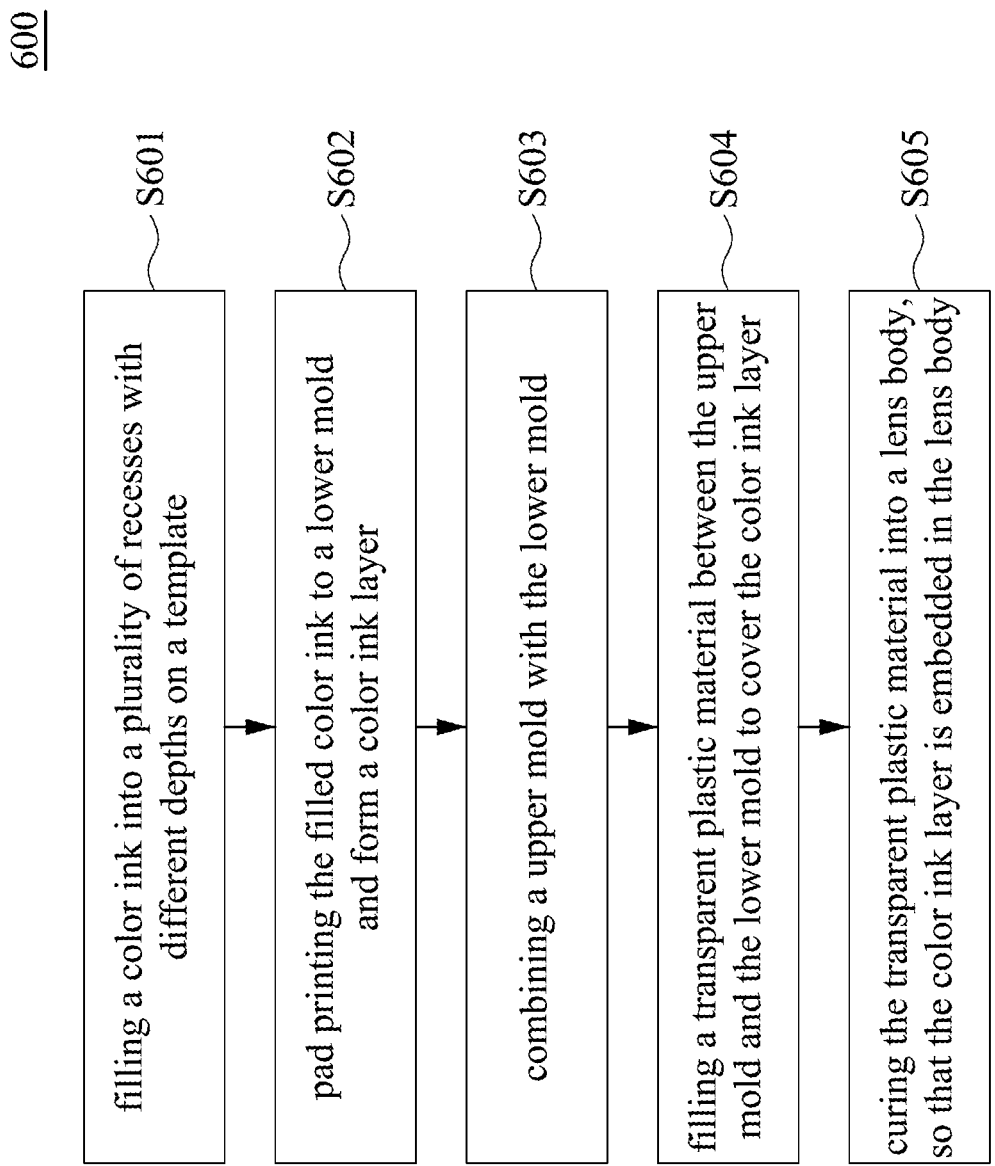
FIG. 6 shows a flow chart of a method of manufacturing a contact lens in accordance with an embodiment of present disclosure.

Reference is made to FIG. 1, FIG. 2, FIG. 3, and FIG. 4, which are sequential schematic views of manufacturing a contact lens 400 using an upper mold UM and a lower mold LM according to an embodiment of the present disclosure. FIG. 6 is a flow chart of a method 600 for manufacturing the contact lens according to an embodiment of the present disclosure. The method 600 of manufacturing the contact lens includes step S601, step S602, step S603, step S604, and step S605. The operation of step S601 to step S605 will be described in detail below.

First, the step S601 is performed: filling a color ink C into a plurality of recesses with different depths on a template. Specifically, the operator can use equipment or tools (not shown; for example, oil brush, ink nozzle, etc.) with coating or ink discharge function to fill the color ink C into the recesses of the template (not shown; for example, a steel plate). It should be particularly noted that the depths of these recesses are substantially different from each other.

Next, the step S602 is performed: pad printing the filled color ink C to the lower mold LM and form a color ink layer CL. Specifically, the operator can use a pad printing tool (not shown; for example, a pad) to dip or extract the color ink C filled in the recesses on a surface of the pad printing tool, and then the operator moves the color ink C on the surface of the pad printing tool. The printing tool is placed above the lower mold LM. Then, the operator operates the pad printing tool stained with the color ink C and presses it toward the lower mold LM. Reference is made to FIG. 1, when the pad printing tool is far away from the lower mold LM after pressing, the color ink C is attached to the lower mold LM, and the color ink C on the lower mold LM forms a color ink layer CL. As shown in FIG. 1, the color ink layer CL has a plurality of color ink membrane thicknesses T, and the thicknesses of these color ink membrane thicknesses T are different from each other.

In some embodiments, the different thicknesses of the color ink membrane thicknesses T are substantially equal to the different depths of the recesses on the template.

Figure 2:
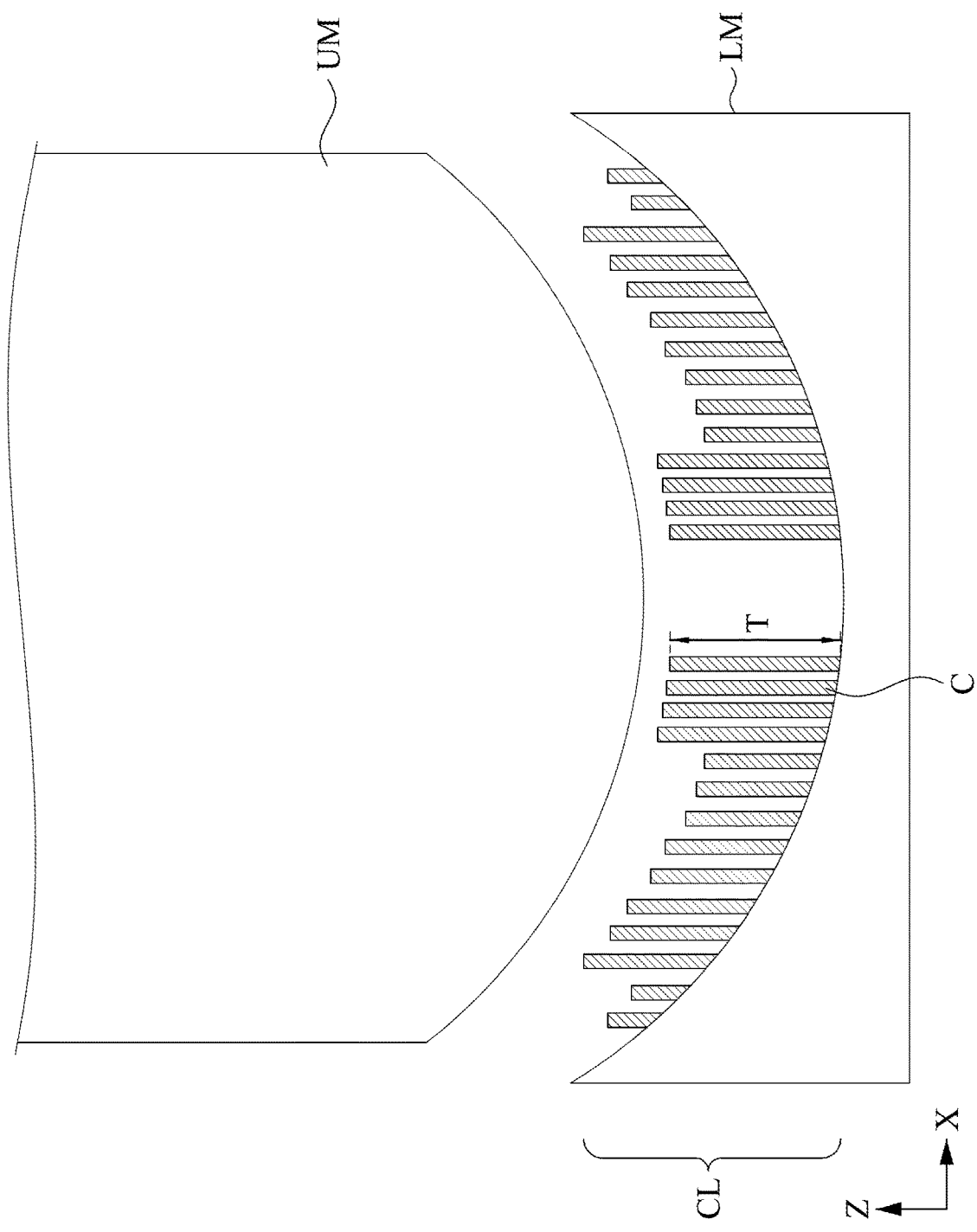
FIG. 2 shows a schematic view of manufacturing the contact lens using the upper mold and the lower mold in accordance with an embodiment of present disclosure.

Next, the step S603 is performed: the upper mold UM is combined with the lower mold LM. Specifically, as shown in FIG. 2, the operator can operate the upper mold UM to press against the lower mold LM to combine the upper mold UM with the lower mold LM.

Figure 3:
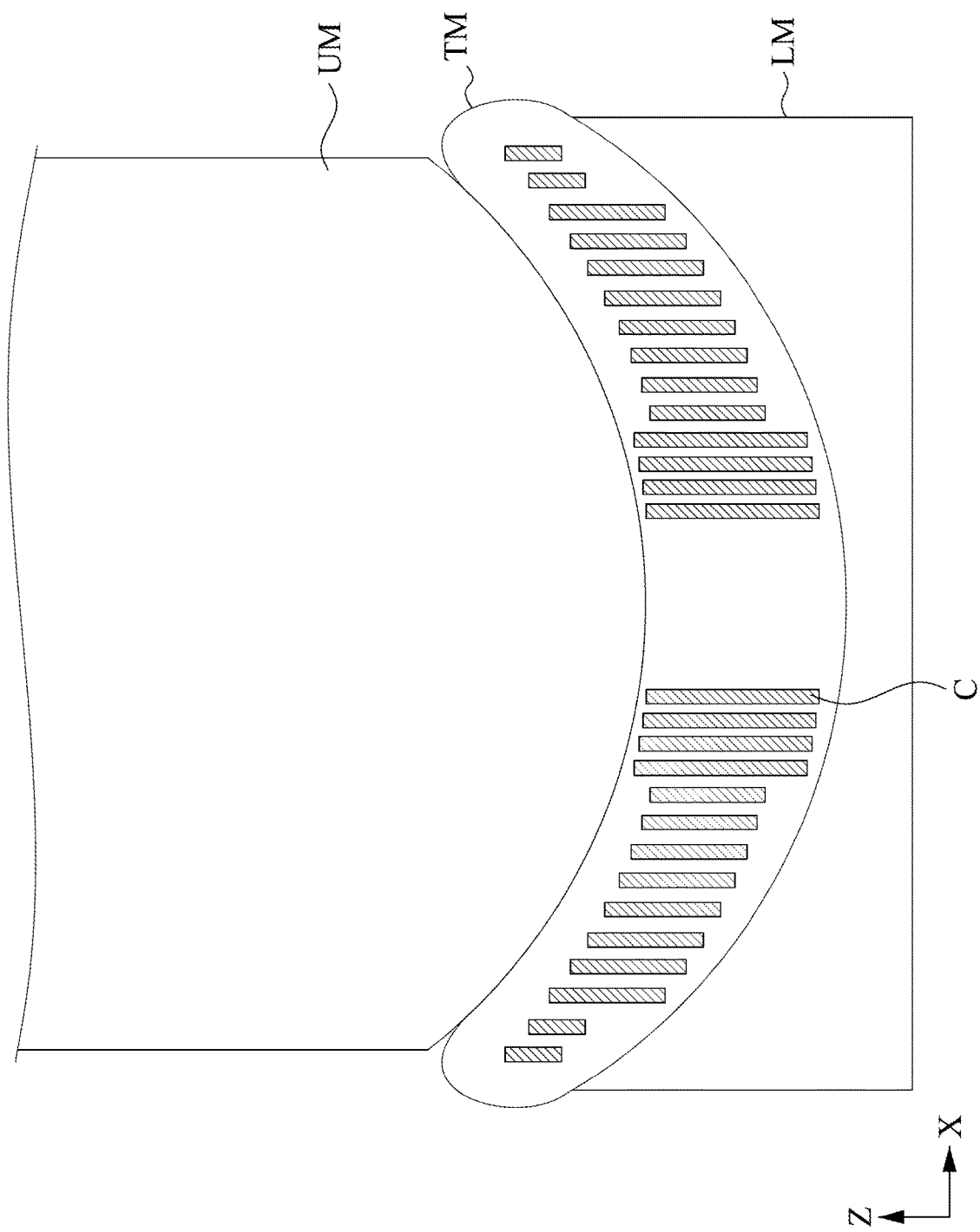
FIG. 3 shows a schematic view of manufacturing the contact lens using the upper mold and the lower mold in accordance with an embodiment of present disclosure.

Next, step S604 is performed: filling the transparent plastic material TM between the upper mold UM and the lower mold LM to cover the color ink layer CL. Specifically, the operator can operate to form a molten or liquid transparent plastic material TM between the upper mold UM and the lower mold LM by injection molding, and the transparent plastic material TM covers the ink layer CL (Please refer to FIG. 3). Specifically, as shown in FIG. 3, the transparent plastic material TM formed between the upper mold UM and the lower mold LM is formed into the shape of the lens of the contact lens. The above methods or means for forming the transparent plastic material TM between the upper mold UM and the lower mold LM are merely examples for simple description. The present disclosure does not intend to limit the method or means of forming the transparent plastic material TM between the upper mold UM and the lower mold LM.

In some embodiments, the transparent plastic material TM is a silicone hydrogel. In some embodiments, the transparent plastic material TM is a HEMA (2-hydroxyethyl methacrylate) hydrogel, but the present disclosure is not limited thereto. In some embodiments, the transparent plastic material TM can be any material that can form the lens part of the contact lens.

Figure 4:
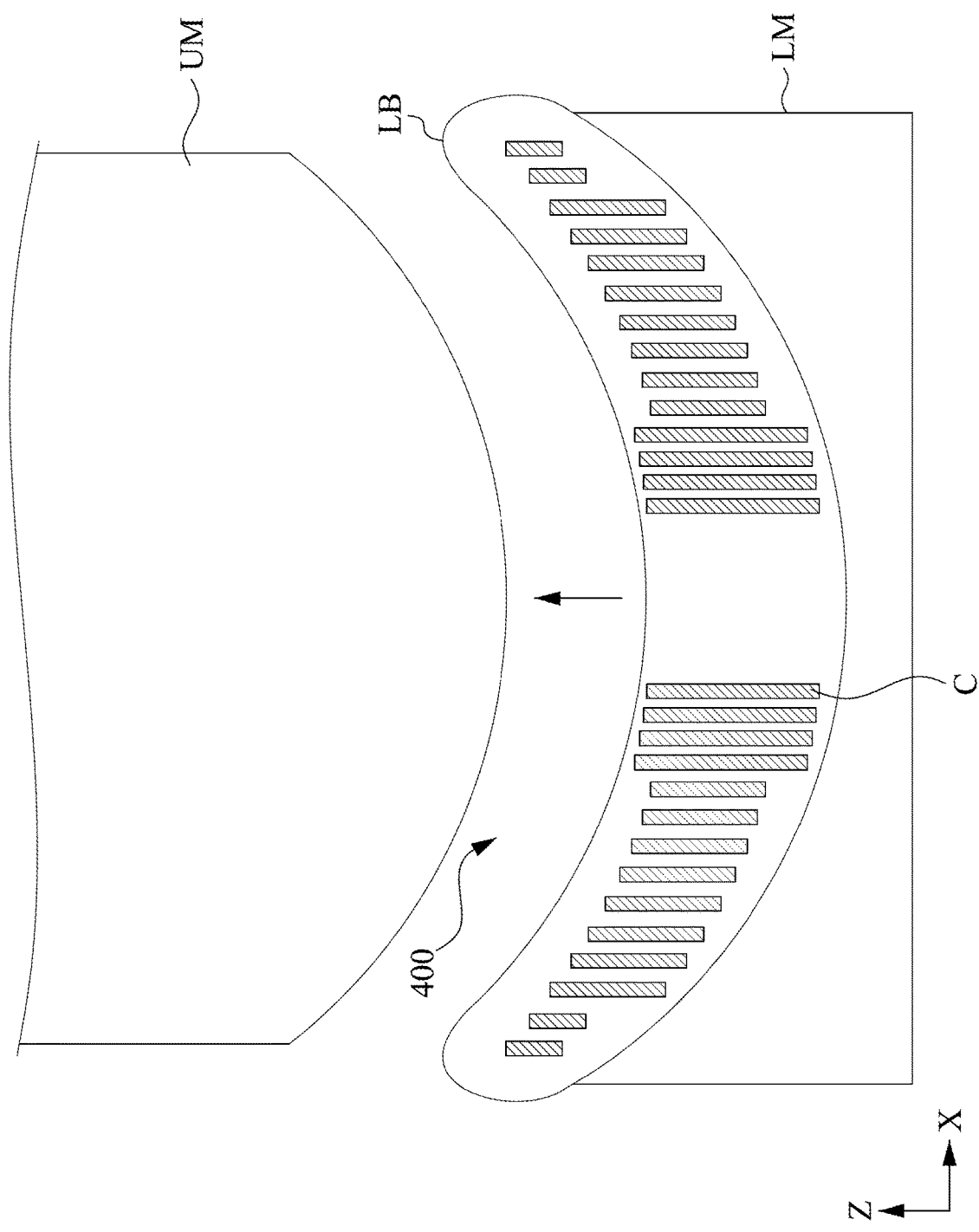
FIG. 4 shows a schematic view of manufacturing the contact lens using the upper mold and the lower mold in accordance with an embodiment of present disclosure.

Next, step S605 is performed: curing the transparent plastic material TM into the lens body LB, so that the color ink layer CL is embedded in the lens body LB. Specifically, after filling the transparent plastic material TM between the upper mold UM and the lower mold LM, the operator performs a curing process on transparent plastic material TM, so that the molten or liquid transparent plastic material TM can be hardened into a solid transparent plastic material TM. The solid transparent plastic material TM forms the lens body LB. Then, as shown in FIG. 4, when the upper mold UM is far away from the lower mold LM, the lens body LB is still attached to the lower mold LM, and the lens body LB and the color ink layer CL with the color ink C embedded in the lens body LB thereby forming the contact lens 400.

The contact lens 400 can be manufactured by performing the steps S601 to S605 of the method 600 of manufacturing the contact lens.

In some embodiments, the color ink layer CL can also be formed by directly injecting the color ink C onto the lower mold LM without using the template.

Figure 5:
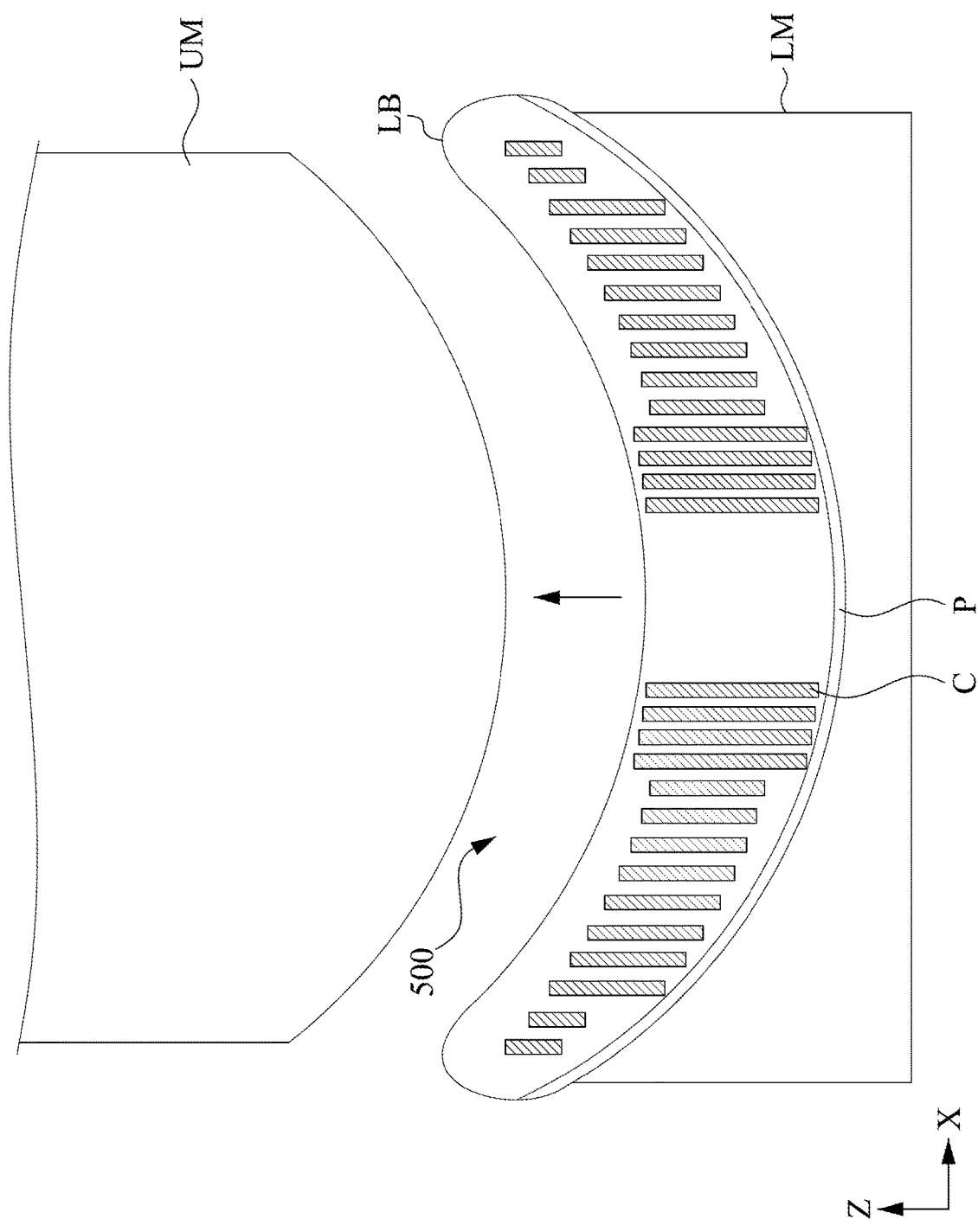
FIG. 5 shows a schematic view of manufacturing the contact lens using the upper mold and the lower mold in accordance with an embodiment of present disclosure.

Reference is made to FIG. 5. In some embodiments, after the step S601 is performed, the transparent protective layer P can be filled into the lower mold LM, and then the step S602 is performed. Accordingly and specifically, as shown in FIG. 5, the ink layer CL is formed on the transparent protective layer P, so that the transparent protective layer P protects the ink layer CL, thereby forming the contact lens 500.

In some embodiments, the aforementioned transparent protective layer P may have a relatively thick thickness, so that a sandwich structure (SW structure) of the contact lens 500 in which the lens body LB is covered at least above and below the ink layer CL is formed by performing the method 600 of manufacturing the contact lens.

In some embodiments, the aforementioned transparent protective layer P may have a relatively thin thickness, so that the SW structure of the contact lens 500 in which the lens body LB is covered at least above and below the ink layer CL is formed by performing the method 600 of manufacturing the contact lens.

In some embodiments, in the step S603 and the step S604, the transparent plastic material TM may be filled into the lower mold LM, and the upper mold UM is combined with the lower mold LM, and pressed against the transparent plastic material TM before performing the step S605.

In summary, the present disclosure does not intend to limit the sequence of the steps S601 to S605 and possible adjustments or changes thereof.

In some embodiments, the color ink membrane thickness T ranges from about 4 microns to about 316 microns. In some embodiments, the preferred range of the color ink membrane thickness T is between about 4 μm and about 40 μm. Alternatively, in some embodiments, the color ink membrane thickness T ranges from about 5 μm to about 37 μm.

Figure 7:
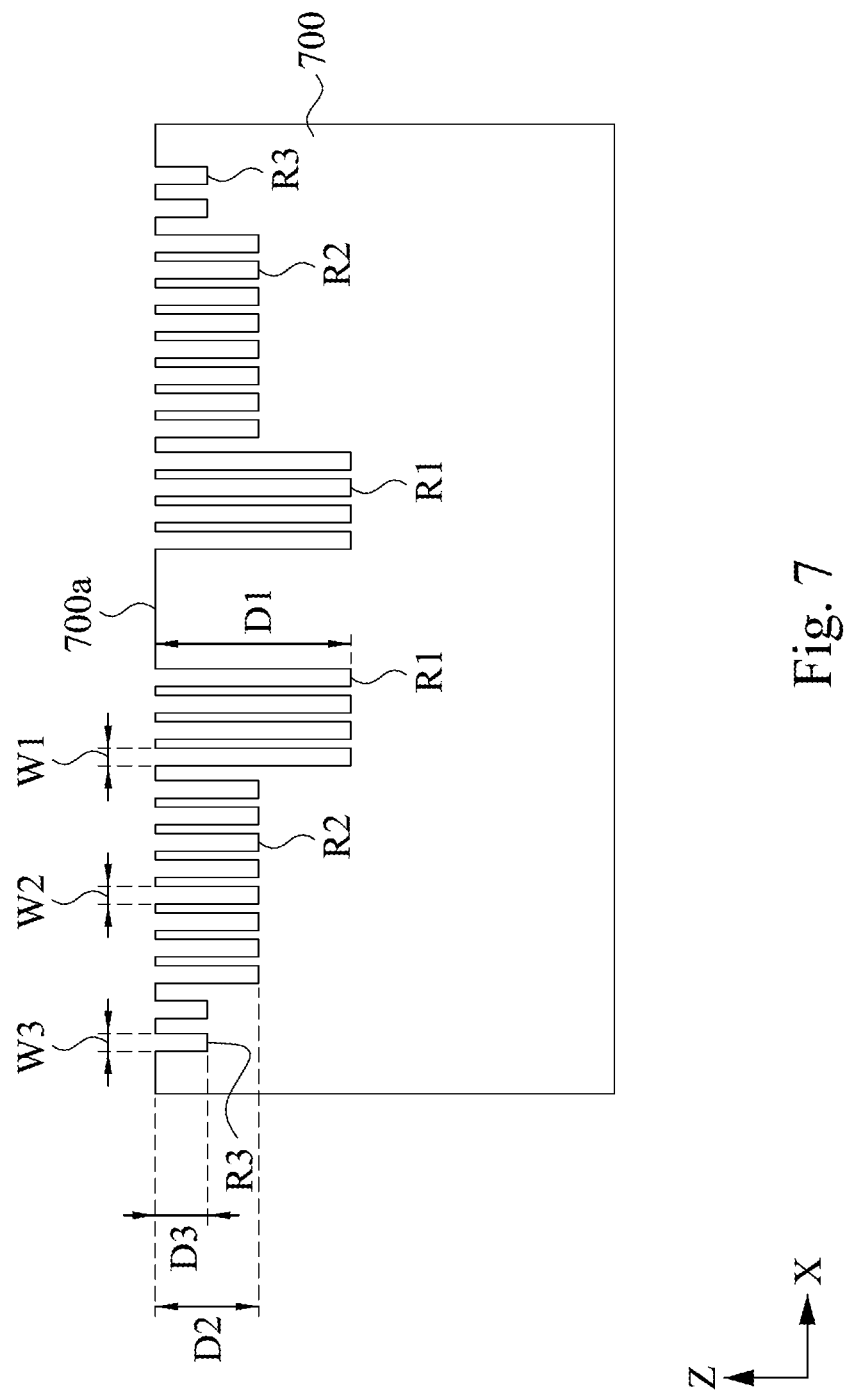
FIG. 7 shows a cross-sectional view of a template in accordance with an embodiment of present disclosure.
Figure 8:
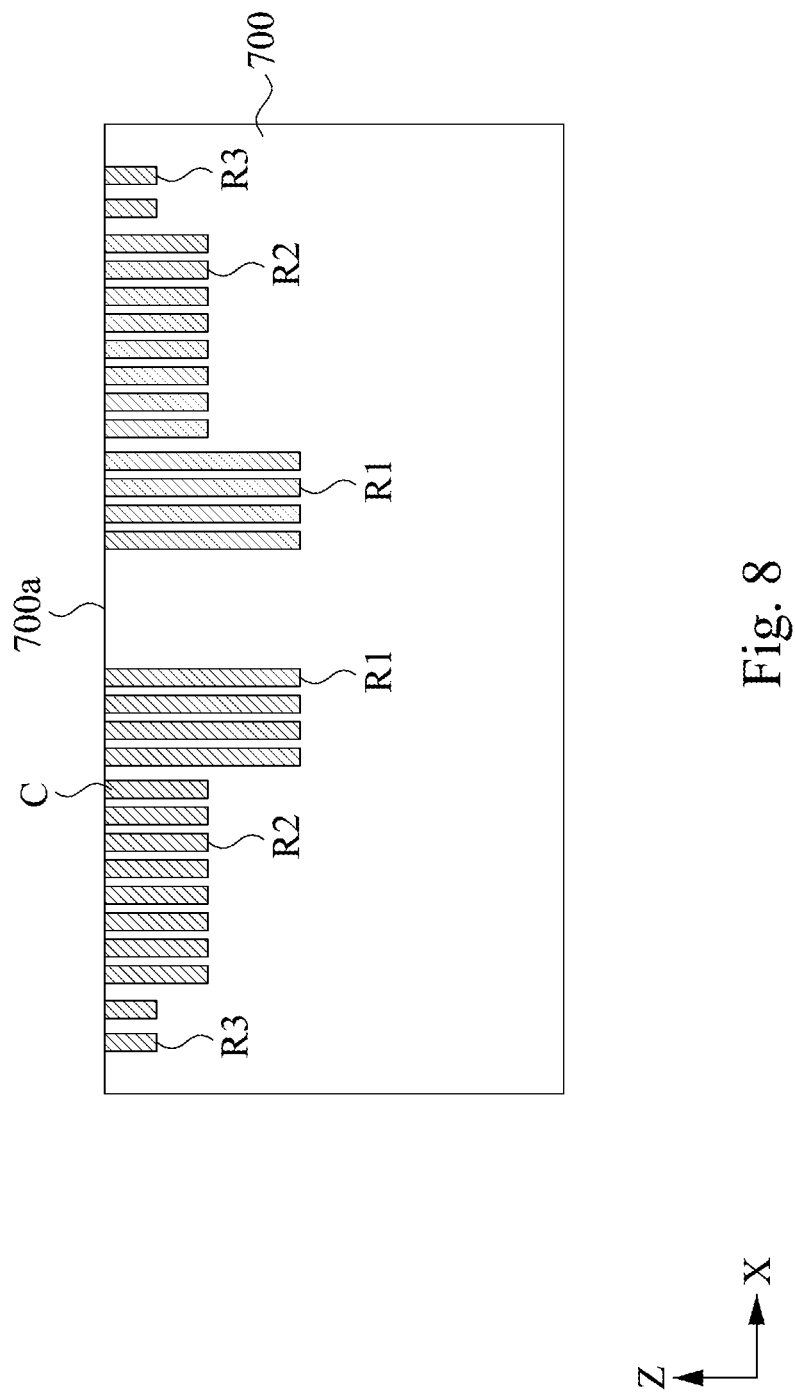
FIG. 8 shows a schematic view of filling a color ink into recesses on the template in accordance with an embodiment of present disclosure.

Reference is made to FIG. 7, which is a cross-sectional view of a template 700 according to an embodiment of the present disclosure. The present disclosure provides the template 700. The template 700 has a surface 700a and has a first recess R1, a second recess R2, and a third recess R3 recessed from the surface 700a. Reference is made to FIG. 8. In some embodiments, in the step S601, the operator can fill the first recess R1, the second recess R2, and the third recess R3 of the template 700 in the step S601 for subsequent operations for forming the color ink layer CL.

In some embodiments, as shown in FIG. 7, the first recess R1 has a first depth D1 and a first width W1, the second recess R2 has a second depth D2 and a second width W2, and the third recess R3 has a third depth D3 and a third width W3.

In some embodiments, as shown in FIGS. 7 and 8, the numbers of the first recesses R1, the second recesses R2, and the third recesses R3 is substantially plural, but the present disclosure is not limited thereto. In some embodiments, the numbers of the first recess R1, the second recess R2, and the third recess R3 may each be one, and the template 700 may only have a single recess (for example, the first recess R1). In other words, the present disclosure does not intend to limit the numbers of the first recess R1, the second recess R2, and the third recess R3.

In some embodiments, the first recess R1, the second recess R2, and the third recess R3 are recessed from the surface 700a of the template 700 by an engraving method of laser (for example, excimer laser) engraving, but the present disclosure is not limited thereto. In some embodiments, the first recess R1, the second recess R2, and the third recess R3 can be formed by any engraving method or etching method that can recess the surface 700a of the template 700. In other words, the present disclosure does not intend to limit the method of forming the first recess R1, the second recess R2, and the third recess R3 on the surface 700a of the template 700.

In some embodiments, the first depth D1, the second depth D2, and the third depth D3 may be substantially different from each other, but the present disclosure is not limited thereto. In some embodiments, the first depth D1, the second depth D2, and the third depth D3 may include two depths in total (for example, the first depth D1 is the same as the second depth D2, but the third depth D3 is different from the first depth D1 or the second depth D2). This is merely an example for simple description, and the present disclosure does not intend to limit.

In some embodiments, the first depth D1, the second depth D2, and the third depth D3 are in the range of about 4 μm to about 316 μm. In some embodiments, the preferred range of the first depth D1, the second depth D2, and the third depth D3 is between about 4 μm and about 40 μm. Alternatively, in some embodiments, the first depth D1, the second depth D2, and the third depth D3 are in the range of about 5 μm to about 37 μm.

It should be noted that, as shown in FIG. 7, the definition of depth is a distance extending from the surface 700a toward a side away from the surface 700a.

In a single tone pattern design, the depths of the recesses of the template 700 may be arranged in arbitrary composition, and the arrangement of the depths of the recesses of the template 700 may include "the depths of the recesses in the edge area of the template 700 are shallower, and the depths of the recesses in the central area of the template 700 are deeper" and "the depths of the recesses in the edge area of the template 700 are deeper, and the depths of the recesses in the central area of the template 700 are shallower", or the aforementioned depths of different recesses are randomly distributed and arranged to form the color ink layer CL on the lens body LB, subsequently. In addition, in the two-tone, three-tone, or multi-tone pattern design, the depths of the recesses of the template 700 may also be arranged in arbitrary composition. The depths of the recesses of the template 700 may include "the depths of the recesses in the edge area of the template 700 are shallower, and the depths of the recesses in the central area of the template 700 are deeper" and "the depths of the recesses in the edge area of the template 700 are deeper, and the depths of the recesses in the central area of the template 700 are shallower", or the aforementioned depths of different recesses are randomly stacked or distributed and arranged to form the color ink layer CL on the lens body LB, subsequently. The foregoing is merely an example, and the present disclosure does not intend to limit.

In some embodiments, the first width W1, the second width W2, and the third width W3 are substantially different from each other, but the present disclosure is not limited thereto. In some embodiments, the first width W1, the second width W2, and the third width W3 may include two widths in total (for example, the first width W1 is the same as the second width W2, but the third width W3 is different from the first width W1 or the second width W2). Alternatively, in some embodiments, the first width W1, the second width W2, and the third width W3 may include one width (for example, the first width W1, the second width W2, and the third width W3 are all the same). This is merely an example for simple description, and the present disclosure does not intend to limit.

In some embodiments, the first width W1, the second width W2, and the third width W3 range from about 0.03 mm to about 14 mm. In some embodiments, the preferred range of the first width W1, the second width W2, and the third width W3 is between about 0.04 mm and about 7.13 mm. Alternatively, in some embodiments, the first width W1, the second width W2, and the third width W3 range from about 0.07 mm to about 0.2 mm.

In some embodiments, especially in embodiments where the numbers of the first recesses R1, the second recesses R2, and the third recesses R3 are plural, the plurality of first widths W1 of the plurality of first recesses R1 may be different from each other. Similarly, the plurality of second widths W2 of the plurality of second recesses R2 may be different from each other, and the plurality of third widths W3 of the plurality of third recesses R3 may also be different from each other.

In some embodiments, as shown in FIGS. 7 and 8, the number of template 700 is one. It should be noted that the scope and spirit of the present disclosure is that the surface 700a of the template 700 may have at least a plurality of recesses with different depths. Therefore, in this embodiment, the single template 700 is taken as an example for illustration. In the single tone pattern design, the depths of the recesses of the single template 700 may be arranged in arbitrary composition, and the arrangement of the depths of the recesses of the template 700 may include "the depths of the recesses in the edge area of the template 700 are shallower, and the depths of the recesses in the central area of the template 700 are deeper" and "the depths of the recesses in the edge area of the template 700 are deeper, and the depths of the recesses in the central area of the template 700 are shallower", or the aforementioned depths of different recesses are randomly distributed and arranged to form the color ink layer CL on the lens body LB, subsequently. In addition, in the two-tone, three-tone, or multi-tone pattern design, the depths of the recesses of the template 700 in each tone may also be arranged in arbitrary composition. The arrangement of the depths of the recesses of the template 700 may include "the depths of the recesses in the edge area of the template 700 are shallower, and the depths of the recesses in the central area of the template 700 are deeper" and "the depths of the recesses in the edge area of the template 700 are deeper, and the depths of the recesses in the central area of the template 700 are shallower", or the aforementioned depths of different recesses are randomly stacked or distributed and arranged to form the color ink layer CL on the lens body LB, subsequently.

In some embodiments, for example, a template 700 with three depths of recesses is provided, and a first pigment with a first tone may present three types of color ink concentrations (i.e., visually perceptible colors) through the template 700, a second pigment with a second tone may also present three types of color ink concentrations (i.e., visually perceptible colors) through the template 700, and a third pigment with a third tone may also present three types of color ink concentrations (i.e., visually perceptible colors) through the template 700. Therefore, a colorful pattern formed by using the template 700 and the aforementioned first pigment, the second pigment, and the third pigment may present twenty-seven types of variation of color ink concentrations in total.

Figure 9:
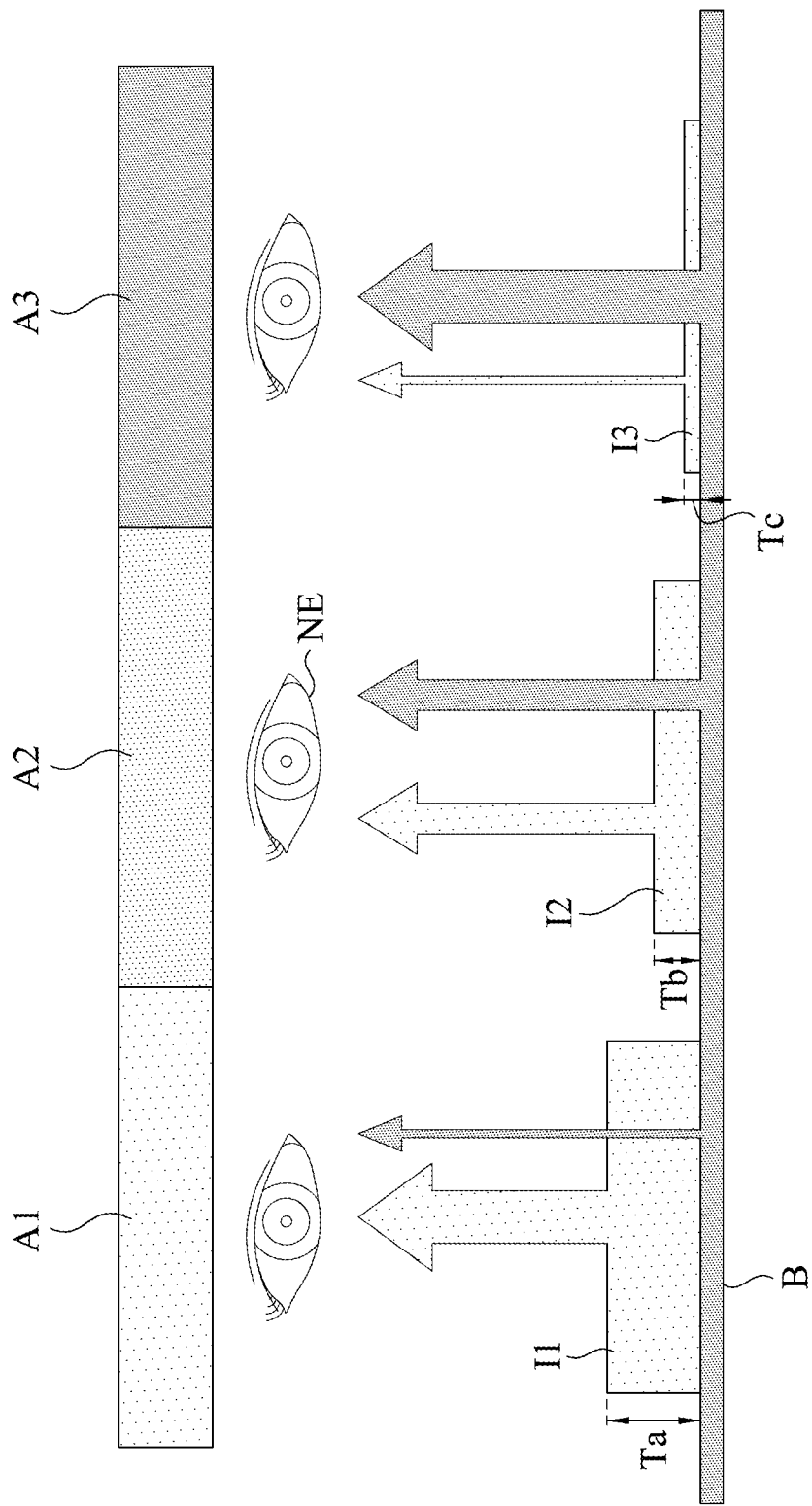
FIG. 9 shows a schematic view of the combination of inks with different ink thicknesses and an under layer allowing the naked eye to perceive different visual colors in accordance with an embodiment of present disclosure.

Reference is made to FIG. 9, which shows a schematic view of a first ink I1, a second ink I2, and a third ink I3 having different ink thicknesses Ta, Tb, and Tc respectively combined with the under layer B so that the naked eye NE perceives different visual colors A1, A2, and A3, according to an embodiment of the present disclosure.

As shown in FIG. 9, if the ink (for example, color ink) is thicker, the ink may mask the color of the under layer and make it less transparent, so it can present a color similar to the original ink. If the ink is thinner, the color of the under layer can show through significantly, and it can show the color similar to the under layer. For example, if the first ink I1 with an ink thickness Ta is located over the under layer B (for example, the pupil of the wearer of the contact lens 400), the colors of the first ink I1 and the under layer B pass through the naked eye NE (for example, different from the naked eye NE of the observer of the wearer of the contact lens 400), and the naked eye NE perceives a first visual color A1. Because the ink thickness Ta is relatively thick, the first visual color A1 will be more similar to the color of the first ink I1. If the third ink I3 with an ink thickness Tc is located over the under layer B, the colors of the third ink I3 and the under layer B pass through the naked eye NE, and the naked eye NE perceives the third visual color A3. Because the ink thickness Tc is relatively thin, the third visual color A3 will be more similar to the color of the under layer B. If the second ink I2 with the ink thickness Tb is located over the under layer B, the colors of the second ink I2 and the under layer B pass through the naked eye NE, and the naked eye NE perceives the second visual color A2. Because the ink thickness Tb is between the ink thickness Ta and the ink thickness Tc, the second visual color A2 will be the mixed color of the second ink I2 and the under layer B.

Hereinafter, the structure of the contact lens 1000 will be described in detail, and how to manufacture another contact lens 1000 by performing the method 600 of manufacturing the contact lens.

Figure 10:
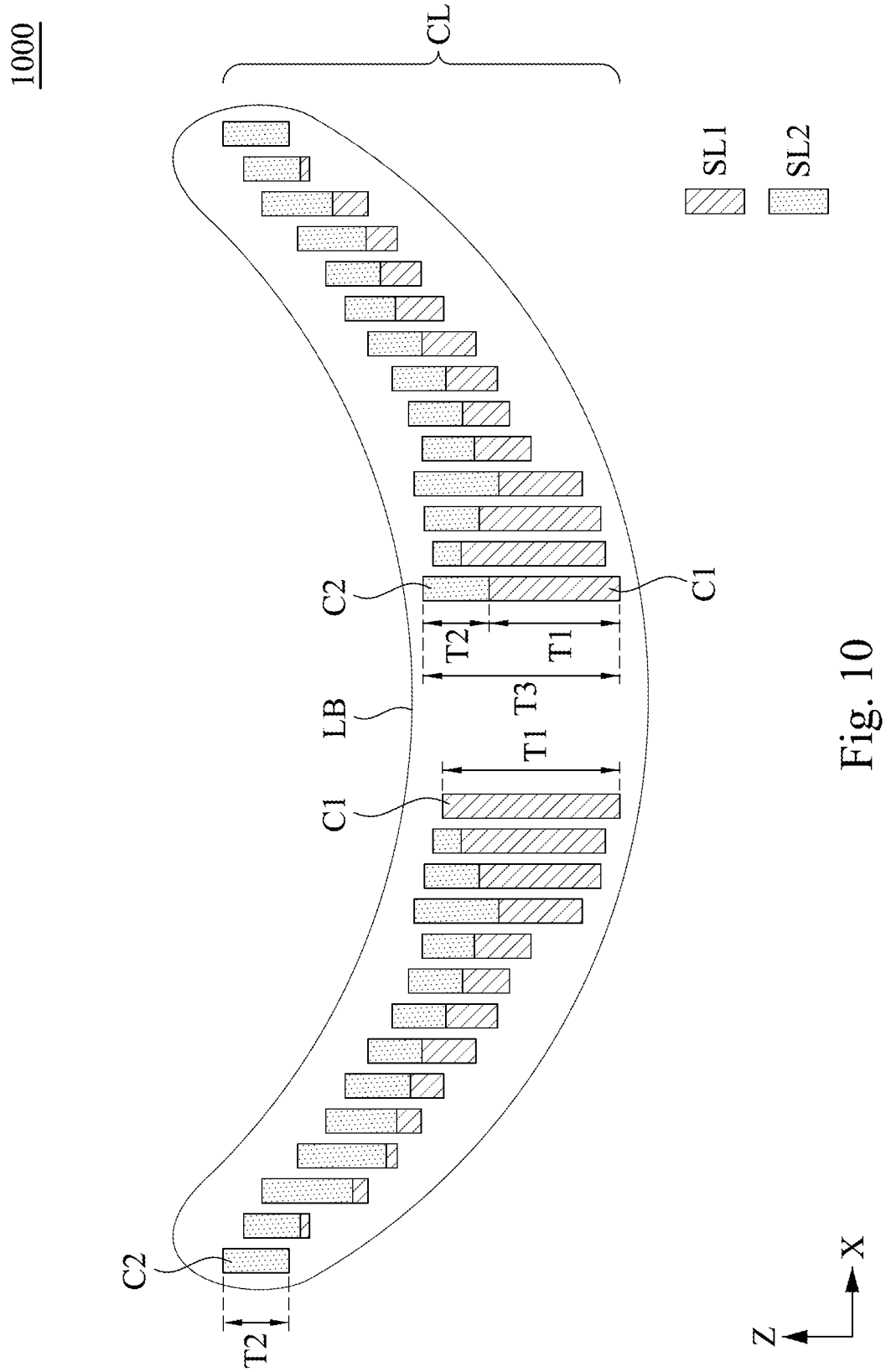
FIG. 10 shows a cross-sectional view of the contact lens in accordance with an embodiment of present disclosure.

Reference is made to FIG. 10, which is a cross-sectional view of a contact lens 1000 according to an embodiment of the present disclosure. The contact lens 1000 includes a lens body LB and a color ink layer CL. The color ink layer CL is embedded in the lens body LB. The color ink layer CL includes a first sublayer SL1 and a second sublayer SL2. The first sub-layer SL1 includes a first color ink C1 and has a first color. The second sub-layer SL2 includes a second color ink C2 and has a second color. The first color is different from the second color. The first sublayer SL1 has a plurality of first color ink membrane thicknesses T1, the second sublayer SL2 has at least a second color ink membrane thickness T2, and the color ink layer CL at least has a third color ink membrane thickness T3 where the first sublayer SL1 overlaps the second sublayer SL2. In the single tone pattern design, the thickness of the color ink membrane thickness T may be arranged in arbitrary composition, and the arrangement of the color ink membrane thicknesses T may include "the color ink membrane thicknesses T in the edge area of the lens body LB are thinner, and the color ink membrane thicknesses T in the central area of the body LB are thicker" and "the color ink membrane thicknesses T in the edge area of the lens body LB are thicker, and the color ink membrane thickness T in the central area of the lens body LB are thinner", or the aforementioned different color ink membrane thicknesses T are randomly distributed and arranged to form different color ink layers CL. In addition, in the two-tone, three-tone, or multi-tone pattern design, the thickness of the color ink membrane thicknesses T may be arranged in arbitrary composition, and the arrangement of the color ink membrane thicknesses T may include "the color ink membrane thicknesses T in the edge area of the lens body LB are thinner, and the color ink membrane thicknesses T in the central area of the lens body LB are thicker" and "the color ink membrane thicknesses T in the edge area of the lens body LB are thicker, and the color ink membrane thicknesses T in the central area of the lens body LB are thinner", or the aforementioned different color ink membrane thicknesses T are randomly stacked or distributed to form different color ink layers CL.

Next, it will be illustrated how to manufacture another contact lens 1000 by performing the method 600 of manufacturing the contact lens.

First, the operator may perform the step S601 to fill the first color ink C1 into a first template (not shown) having a plurality of recesses with different depths, and then perform the step S602 to print the filled-in first color ink C1 to the lower mold LM. Then, the step S601 is performed again to fill the second color ink C2 into a second template (not shown) with a plurality of recesses with different depths, and the step S602 is performed again to print the filled second color ink C2 to the lower mold LM. The first color ink C1 and the second color ink C2 on the lower mold LM form the color ink layer CL. Then, the step S603, the step S604, and the step S605 are performed in sequence to manufacture the contact lens 1000 shown in FIG. 10, for example.

Figure 11:
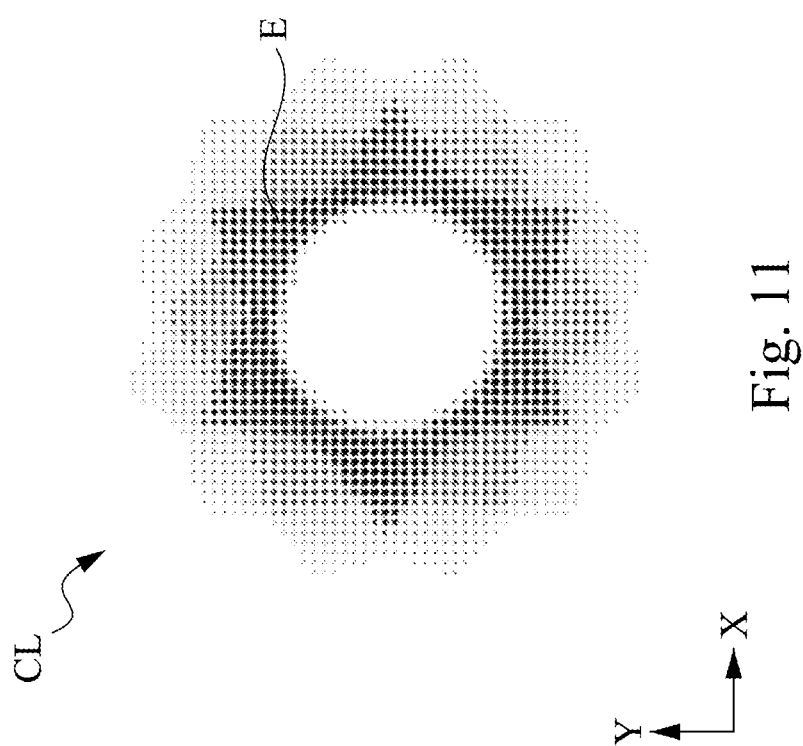
FIG. 11 shows a front view of a color ink layer including color ink elements in accordance with an embodiment of present disclosure.

Reference is made to FIG. 11, which is a front view of a contact lens 400, a contact lens 500, or a contact lens 1000 according to an embodiment of the present disclosure. As shown in FIG. 11, the color ink layer CL includes a plurality of color ink elements E. Reference is then made to FIG. 4, FIG. 5, FIG. 8, FIG. 10 and FIG. 11. In the contact lens 400, the single color ink element E is formed by the color ink C which is filled in a single first recess R1, a second recess R2, or the third recess R3 (as shown in FIG. 4, FIG. 5 and FIG. 8). In the contact lens 1000, the single color ink element E is formed by the first color ink C1 filled in a single recess or the second color ink C2 filled in a single recess, or by the first color ink C1 superimposed with the second color ink C2 filled in a single recess (as shown in FIG. 10). In the present disclosure, the color ink element E may have an area, and the area of the color ink element E is defined as the area of the cross section of the color ink element E on the X-Y plane. In the present disclosure, the color ink element E may have a shape, and the shape of the color ink element E is defined as the shape of the cross section of the color ink element E on the X-Y plane. In the single tone pattern design, the size and area of the color ink element E may be arranged in arbitrary composition, and different sizes and areas of the color ink elements E may include "the sizes and areas of the color ink elements E in the edge area of the lens body LB are smaller, and the sizes and areas of the color ink elements E in the central area of the lens body LB are larger" and "the sizes and areas of the color ink elements E in the edge area of the lens body LB are larger, and the sizes and areas of the color ink elements E in the central area of the lens body LB are smaller", or different sizes and areas of the aforementioned color ink elements E are randomly distributed and arranged on the lens body LB to form a pattern. In addition, in the two-tone, three-tone, or multi-tone pattern design, the sizes and areas of the color ink elements E may be arranged in arbitrary composition, and different sizes and areas of the color ink elements E may include "the sizes and areas of the color ink elements E in the edge area of the lens body LB are smaller, and the sizes and areas of the color ink elements E in the central area of the lens body LB are larger" and "the sizes and areas of the color ink elements E in the edge area of the lens body LB are larger, and the sizes and areas of the color ink elements E in the central area of the lens body LB are smaller", or different sizes and areas of the aforementioned color ink elements E are randomly stacked or distributed and arranged on the lens body LB to form a pattern.

In some embodiments, the areas of the ink elements E may be different from each other.

In some embodiments, the shape of the color ink element E may be a circle, but the present disclosure is not limited thereto. In some embodiments, the shape of the color ink element E is a geometric figure such as a triangle, a tetragon, or a polygon. Alternatively, in some embodiments, the shape of the color ink element E may be an irregularly shaped figure. In other words, the present disclosure does not intend to limit the shape of the color ink element E.

Figure 12:
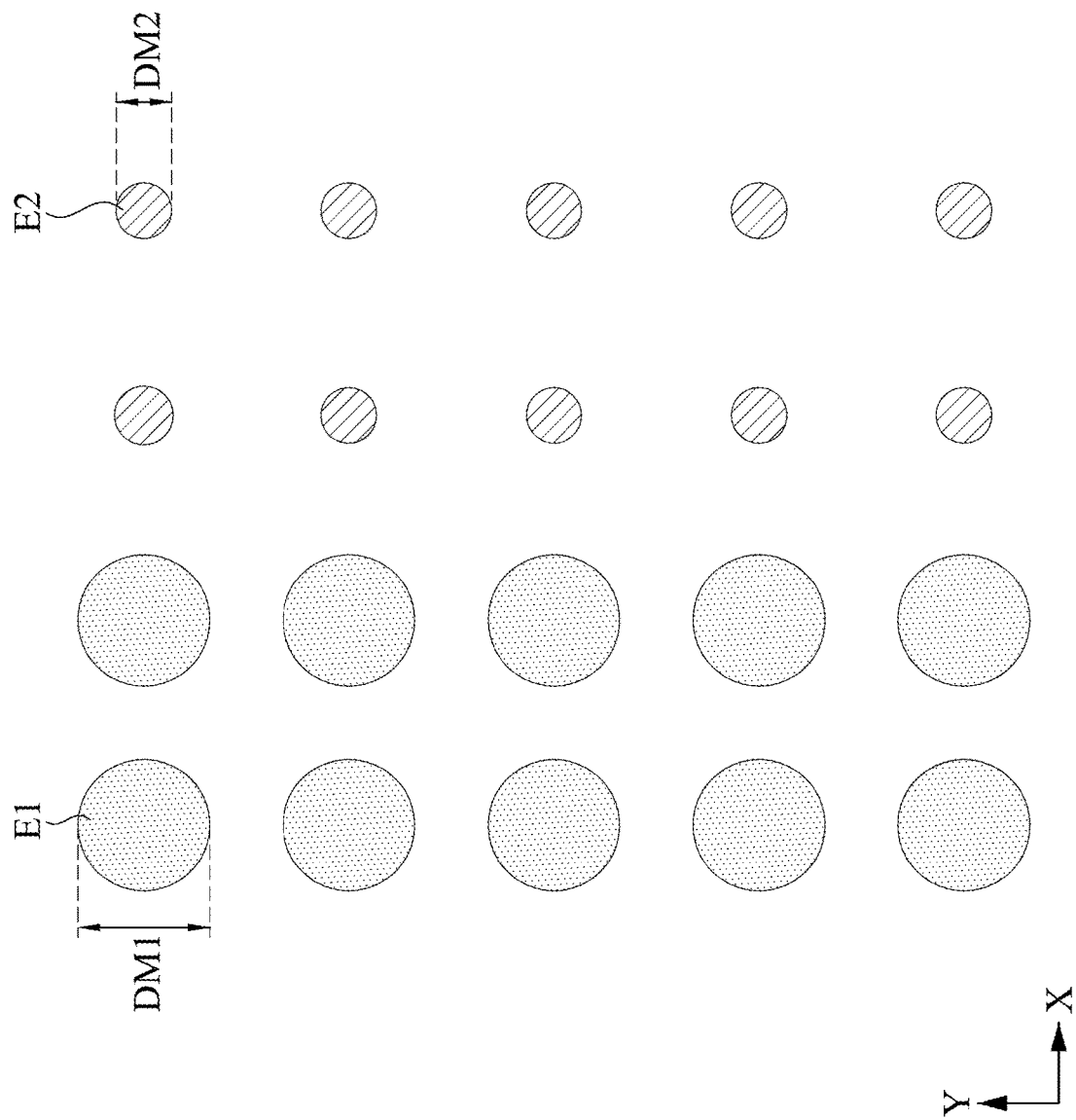
FIG. 12 shows a schematic view of a first color ink element and a second color ink element in accordance with an embodiment of present disclosure.

Reference is made to FIG. 12. In the embodiment where the shape of the color ink element E is circular, the color ink elements E include at least one first ink element E1 and at least one second ink element E2. In some embodiments, at least one first color ink element E1 has a first diameter DM1, and at least one second color ink element E2 has a second diameter DM2.

In some embodiments, the first diameter DM1 and the second diameter DM2 are different from each other, but the present disclosure is not limited thereto. In some embodiments, the first diameter DM1 and the second diameter DM2 may be the same.

In some embodiments, the range of the first diameter DM1 and the second diameter DM2 is between about 0.03 mm to about 14 mm. In some embodiments, the preferred range of the first diameter DM1 and the second diameter DM2 is between about 0.04 mm and about 7.13 mm. Alternatively, in some embodiments, the range of the first diameter DM1 and the second diameter DM2 is between about 0.07 mm to about 0.2 mm.

In the embodiment where the shape of the ink element E is circular, the first diameter DM1 and the second diameter DM2 are substantially equal to the width of the recess of the template 700.

The following specific examples illustrate the advantages of the contact lenses disclosed in the present disclosure.

For example, the area of the color ink element E disclosed in the contact lens of the present disclosure is assumed to have M types of sizes, and the color ink membrane thickness T disclosed in the contact lens of the present disclosure is assumed to have 1+n types of thicknesses (for example, having the thicknesses from the first color ink membrane thickness to the (1+n)-th color ink membrane thickness, where n is a natural number greater than 0), the colorful pattern shown by the color ink layer CL of the contact lens of the present disclosure (the colorful pattern is shown as the front view of the contact lens in FIG. 11) may present M*(1+n) types of combinations of variation of color ink concentrations (i.e., the concept of visual color as shown in FIG. 9). Therefore, the pattern of the contact lens disclosed in the present disclosure may exhibit stronger contrast, level, and three-dimensional effect than the pattern of the contact lens of the prior art.

Alternatively, in some embodiments of the present disclosure, more than two types of templates 700 may be used to form the color ink membrane thicknesses T and the color ink elements E to present richer tones variations. For example, a colorful pattern formed by a template 700 with three types of different depths of recesses distributed and by the first pigment with the first tone, the second pigment with the second tone, and the third pigment with the third tone may present richer variations in tones compared with that of the prior art.

Alternatively, in some embodiments of the present disclosure, the color ink membrane thicknesses T and color ink elements E may be formed by tinting a single pigment into a pigment having multiple tones in advance and/or using two or more templates 700 to present richer tones. For example, two templates 700 with different distributions of the depth of the recesses may be used to present multiple variations in tones (such as 4 to 7 types of variations in tones). In this way, the operator may achieve the effect of saving the manufacturing cost of the template 700 compared with the prior art when manufacturing the contact lens.

In some embodiments, the contact lens may have different sizes such as design size, dry lens size, and wet lens size after undergoing the aforementioned curing process and a hydration process. The differences between the design size, the dry lens size, and the wet lens size will be illustrated below.

To convert the design size to the dry lens size. The numerical value disclosed in the specification and the claims is of the design size. However, in the actual manufacturing process, after the design size is converted to the dry lens size, the curvature of the lower mold LM will slightly affect the dry lens size. In some embodiments, the curvature of the lower mold LM ranges from about 0.114 to about 0.118. Specifically, after the ink is printed on the lower mold LM, under the condition that the depths of the recesses of the template 700 do not change, the size of the pattern on the dry lens and the color ink membrane thickness T will be affected due to the aforementioned curvature.

To convert the dry lens size to the wet lens size. After considering the allowable error value of the design criteria, the size of the wet lens may cause the increase in the size of the pattern after the hydration process by about 1.12 to about 1.27 times due to the expansion rate ranging from 10% to 30%. This is also the actual (pattern) distribution and size of the pattern on the dry lens after the hydration process.

It should be noted that the directions X, Y, and Z depicted in FIGS. 1 to 12 are the coordinate axis directions. The direction X, the direction Y, and the direction Z are substantially perpendicular to each other.

From the aforementioned detailed description of the specific embodiments of the present disclosure, it can be clearly seen that in the contact lens and the manufacturing method thereof of the present disclosure, by engraving a number of recesses of different depths on the template, the effect of printing color inks of different thicknesses onto the lens body in one step is achieved. In addition, in the contact lens and the manufacturing method thereof of the present disclosure, because the thicknesses of several color inks and the area of the color ink elements in the contact lens are different from each other, the pattern presented has stronger contrast, gradation, and three-dimensional effect than the pattern of the contact lenses in the market.

Although the present disclosure has been disclosed as above in the embodiment manner, it is not intended to limit the present disclosure. Those skilled in the art can make various changes and modifications without departing from the spirit and scope of the present disclosure. Therefore, the scope of the present disclosure shall be subject to the scope of the attached claims.

What is claimed is:

1. A contact lens, comprising:
   a lens body; and
   a color ink layer embedded in the lens body and comprising a plurality of color ink membrane thicknesses, the color ink membrane thicknesses being different from each other,
   wherein the color ink layer comprises a plurality of color ink elements, and the color ink elements include M types of areas, wherein the areas are defined as areas of cross sections of the color ink elements on an X-Y plane, wherein M is a natural number greater than one,
   wherein the color ink membrane thicknesses of the color ink layer comprise a first color ink membrane thickness to a (1+n)-th color ink membrane thickness, wherein n is a natural number greater than zero,
   wherein the color ink layer comprises a first sublayer and a second sublayer, the first sublayer has a first color, and the second sublayer has a second color,
   wherein the first sublayer has a plurality of first color ink membrane thicknesses, the second sublayer at least has a second color ink membrane thickness, and the color ink layer at least has a third color ink membrane thickness where the first sublayer and the second sublayer overlap,
   wherein the color ink membrane thicknesses and the M types of areas form M*(1+n) unit color ink concentrations, and the M*(1+n) unit color ink concentrations form a multicolor pattern in the lens body,
   wherein one of the color ink elements is formed by a first color ink superimposed with a second color ink,
   wherein a width of one of the color ink elements of the first sublayer and a width of one of the color ink elements of the second sublayer superimposed with the one of the color ink elements of the first sublayer remain constant along a thickness direction of the lens body.

2. The contact lens of claim 1, wherein the color ink membrane thicknesses are in a range from 4 μm to 316 μm.

3. The contact lens of claim 1, wherein the color ink elements comprise at least one first color ink element and at least one second color ink element, the at least one first color ink element has a first diameter, and, the at least one second color ink element has a second diameter.

4. The contact lens of claim 3, wherein the first diameter and the second diameter are in a range from 0.03 mm to 14 mm.

5. The contact lens of claim 1, wherein the M*(1+n) unit color ink concentrations comprise at least one color ink pigment.

* * * * *